United States Patent
Kordik et al.

(10) Patent No.: US 10,442,422 B2
(45) Date of Patent: Oct. 15, 2019

(54) SYSTEMS AND METHODS FOR MONITORING A HEALTH STATUS OF A SERVO VALVE

(71) Applicant: GOODRICH CORPORATION, Charlotte, NC (US)

(72) Inventors: Michael Kordik, Dayton, OH (US); Marc Georgin, Dayton, OH (US)

(73) Assignee: GOODRICH CORPORATION, Carlotte, NC (US)

( * ) Notice: Subject to any disclaimer, the term of this patent is extended or adjusted under 35 U.S.C. 154(b) by 157 days.

(21) Appl. No.: 15/852,800

(22) Filed: Dec. 22, 2017

(65) Prior Publication Data

US 2019/0193708 A1 Jun. 27, 2019

(51) Int. Cl.
 B60T 17/22 (2006.01)
 B60T 8/17 (2006.01)
 F16K 37/00 (2006.01)

(52) U.S. Cl.
 CPC .......... B60T 17/221 (2013.01); B60T 8/1703 (2013.01); B60T 17/22 (2013.01); F16K 37/0041 (2013.01)

(58) Field of Classification Search
 CPC ...... B60T 17/221; B60T 17/22; B60T 8/1703; F16K 37/0041
 See application file for complete search history.

(56) References Cited

U.S. PATENT DOCUMENTS

| | | | |
|---|---|---|---|
| 3,789,736 A | 2/1974 | Williams | |
| 7,128,376 B2 | 10/2006 | Williams et al. | |
| 8,118,256 B2 * | 2/2012 | Cahill | B60T 8/00 244/111 |
| 8,434,301 B2 * | 5/2013 | Fukui | F04B 49/002 60/405 |
| 9,423,050 B2 * | 8/2016 | Anderson | F16K 31/1262 |
| 9,726,643 B2 * | 8/2017 | Comeaux | G05B 23/0245 |
| 10,176,070 B2 * | 1/2019 | Cahill | G06F 11/3013 |
| 2010/0090058 A1 | 4/2010 | Cahill et al. | |
| 2011/0256000 A1 | 10/2011 | Fukui | |
| 2014/0182381 A1 | 7/2014 | Comeaux et al. | |
| 2014/0303793 A1 | 10/2014 | Anderson | |
| 2016/0342496 A1 | 11/2016 | Cahill et al. | |

FOREIGN PATENT DOCUMENTS

| | | |
|---|---|---|
| CN | 102890115 | 1/2013 |
| EP | 1130302 | 9/2001 |
| EP | 1555472 | 7/2005 |
| FR | 3014527 | 6/2015 |

OTHER PUBLICATIONS

European Patent Office, European Search Report dated Apr. 23, 2019 in Application No. 18214650.6.

* cited by examiner

Primary Examiner — Freddie Kirkland, III
(74) Attorney, Agent, or Firm — Snell & Wilmer, L.L.P.

(57) ABSTRACT

Braking control systems and methods, such as for an aircraft, use a first pressure sensor and a second pressure sensor from a non-primary braking system to validate the first pressure sensor. In response to the first pressure sensor being validated, a health status of a servo valve is monitored based on predetermined characteristics about the servo valve, including electrical current input into the servo valve and hydraulic pressure output from the servo valve.

20 Claims, 5 Drawing Sheets

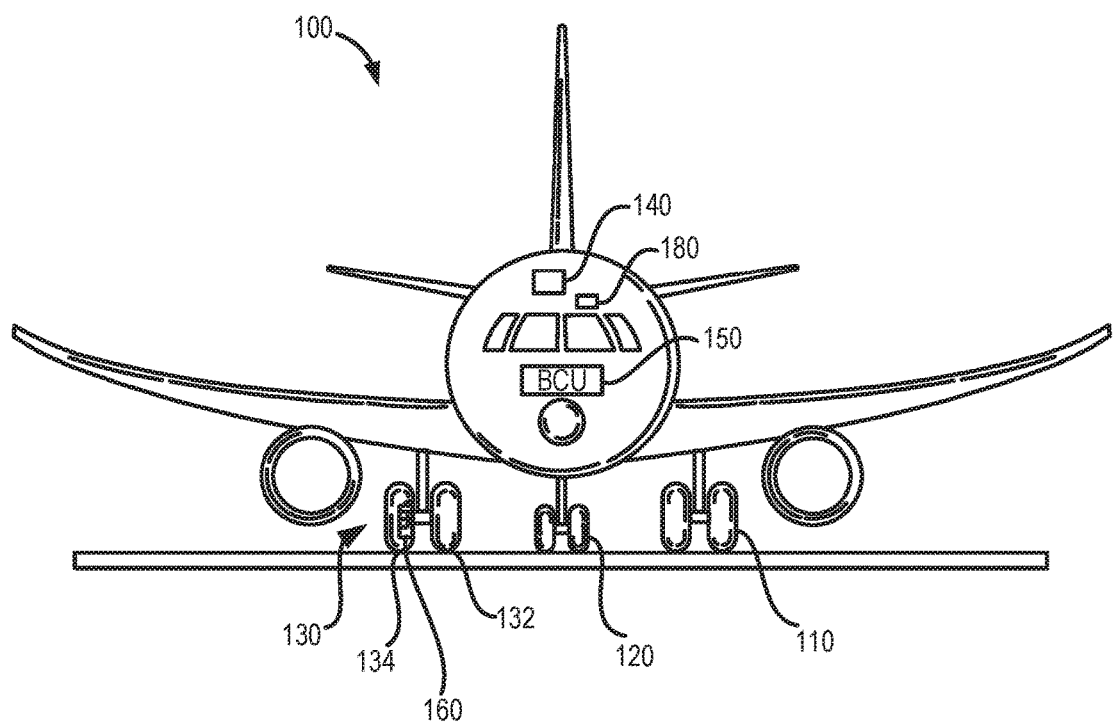
FIG. 1-A

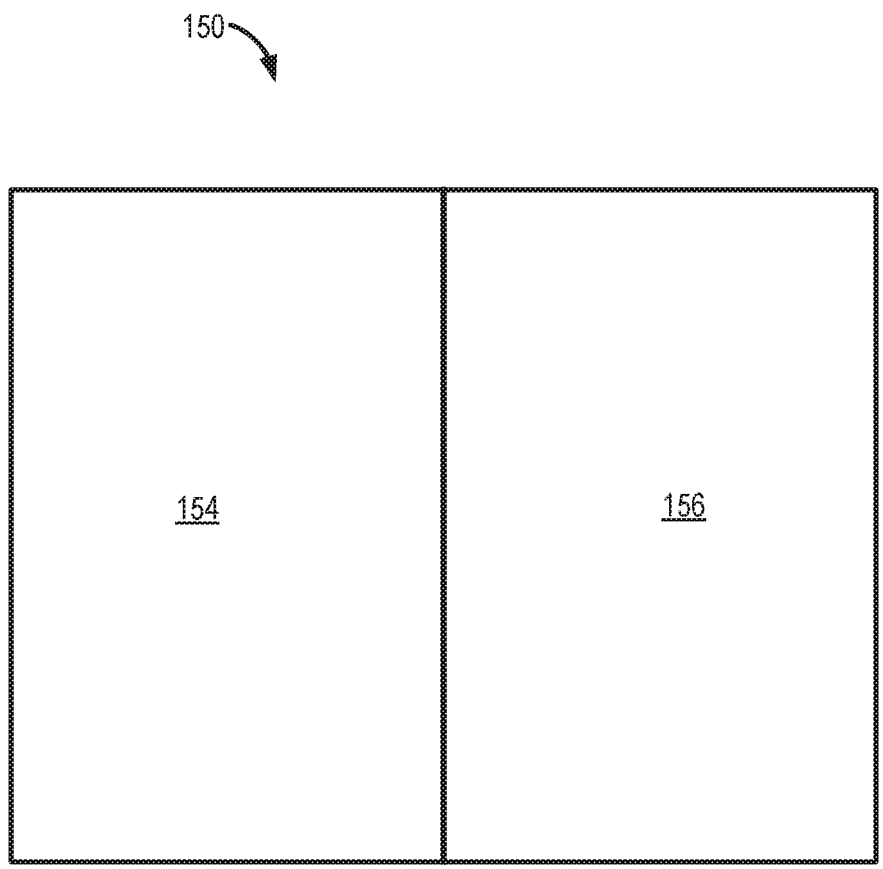
FIG. 1-B

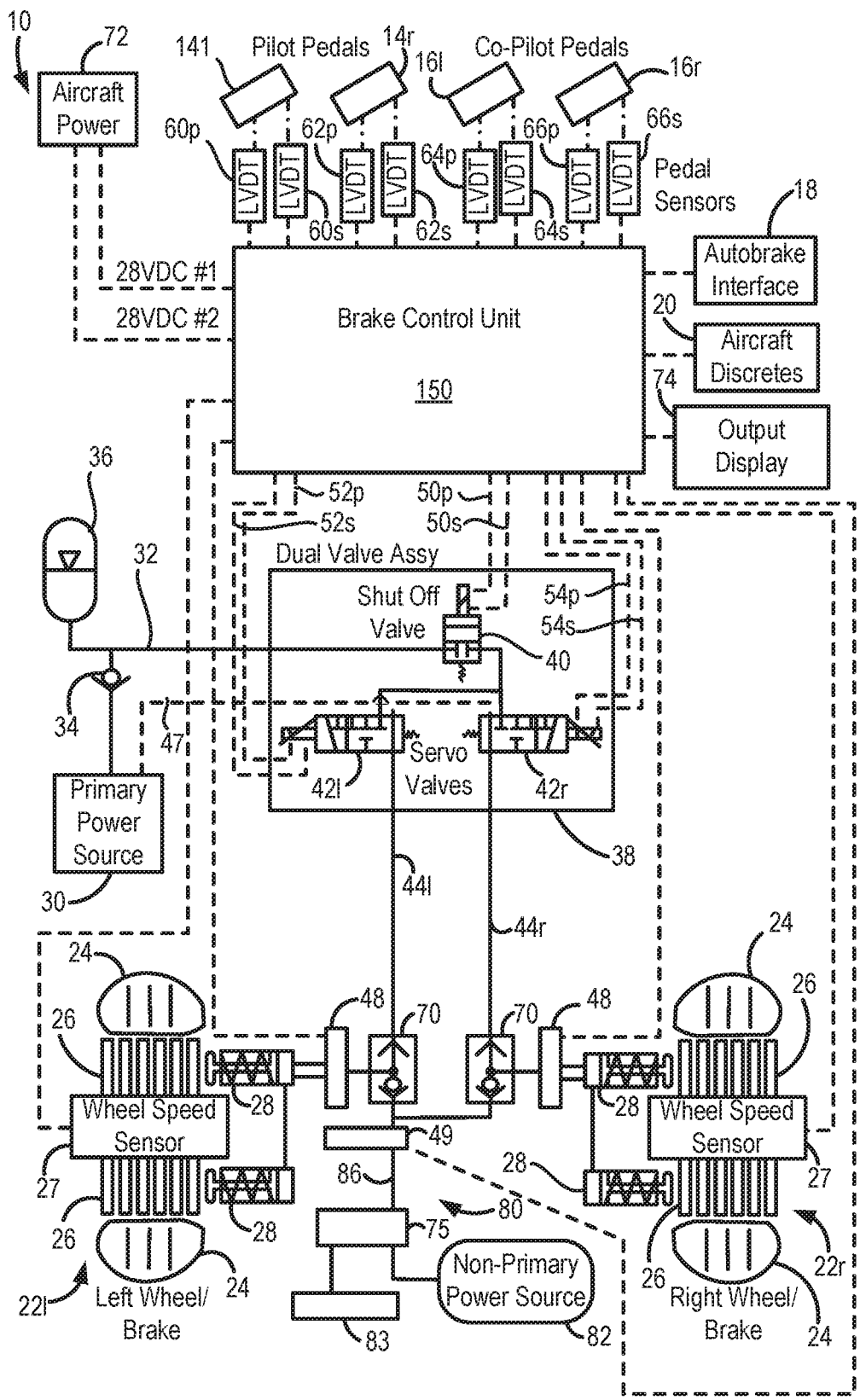
FIG. 1-C

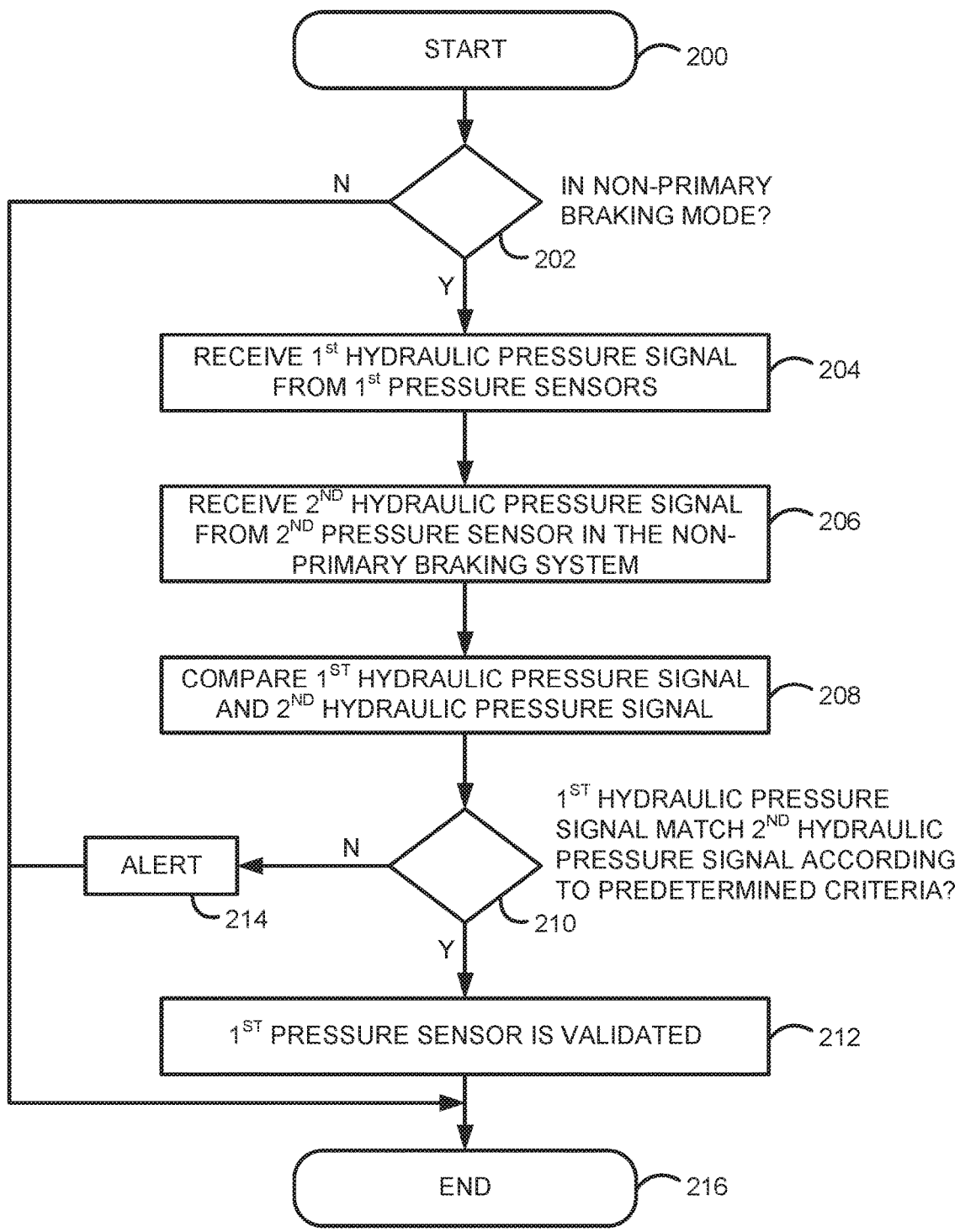
FIG. 2-A

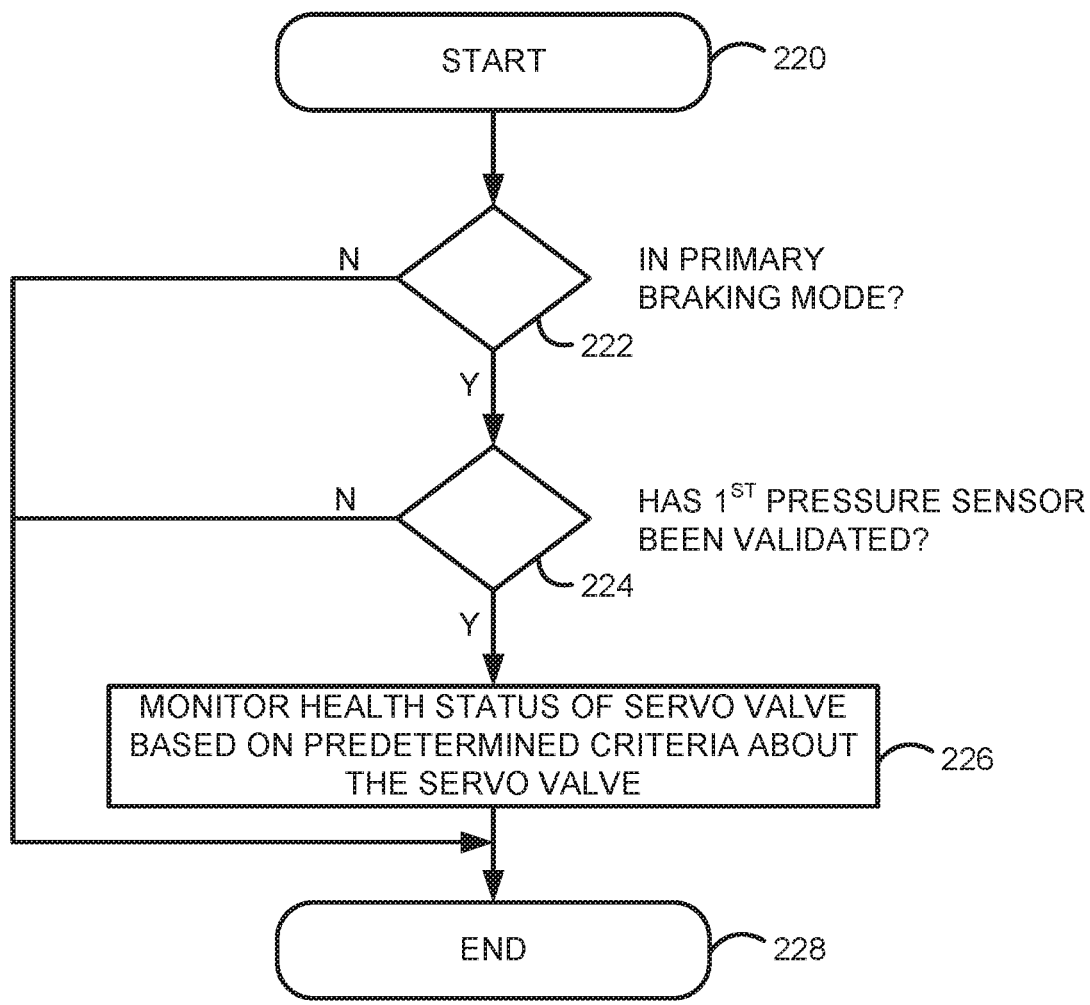
FIG. 2-B

SYSTEMS AND METHODS FOR MONITORING A HEALTH STATUS OF A SERVO VALVE

FIELD

In general, the arrangements disclosed herein relate to braking systems and methods. More specifically, they relate to improvements for braking systems and methods suitable for use in aircraft.

BACKGROUND

Aircraft include many parts that are suitable for monitoring and periodic replacement. For example, many aircraft braking systems include one or more servo valves suited for converting variations in an electrical signal into variations in how much hydraulic fluid is transmitted to a brake actuator. Such servo valves can be used to control powerful hydraulic cylinders with small electrical signals. They can provide precise levels of control over force, position, pressure, and velocity, etc., such as by electrically coupling to a power source to apply a desired amount of electrical current to the servo valve in order to actuate a poppet internal to the servo valve and suitably open or close the servo valve to thus control the amount of hydraulic pressure output by the servo valve. Sensors in communication with servo valves can monitor the amount of electrical current (electrical signal) input into the servo valve and the corresponding hydraulic pressure output from the servo valve (hydraulic pressure signal).

In many closed loop systems, such as aircraft braking systems, it can be imperative to maintain a desired hydraulic pressure output from a servo valve, regardless of the input electrical signal, in order to maintain proper braking forces on an actuator in order to impact the wheel of an aircraft. Accordingly, it can be difficult to ascertain a deteriorating condition or fault in a servo valve if the hydraulic pressure signal output from the servo valve is maintained at a nearly constant level by compensating (e.g., increasing or decreasing) the electrical signal input into the servo valve.

SUMMARY

In various embodiments, a brake control system for monitoring a health status of a servo valve includes a non-transitory memory configured to store instructions; and a controller in electronic communication with the memory, the controller configured to: receive a first hydraulic pressure signal from a first pressure sensor in communication with a brake actuator; receive a second hydraulic pressure signal from a second pressure sensor in a non-primary braking system in communication with the brake actuator; compare the first hydraulic pressure signal and second hydraulic pressure signal according to predetermined criteria; validate the first pressure sensor based on the comparison; and in response to the first pressure sensor being validated, monitor the health status of the servo valve in communication with the brake actuator based on predetermined criteria.

In various embodiments: the first hydraulic pressure signal is independent of the second hydraulic pressure signal and the first pressure sensor is independent of the second pressure sensor; and/or the controller is configured to validate the first pressure sensor by comparing the first hydraulic pressure signal and the second hydraulic pressure signal over multiple readings thereof over time; and/or the controller is configured to signal an alert in response to differences between the first hydraulic pressure signal and the second hydraulic pressure signal; and/or the controller is configured to signal an alert in response to the health status of the servo valve; and/or the health status of the servo valve in communication with the brake actuator based on predetermined criteria includes comparing an electric current signal input into the servo valve as converted into a hydraulic pressure signal and the first hydraulic pressure signal; and/or the brake actuator is configured to actuate a braking force on a wheel of an aircraft in response to one or more system inputs representing one or more brake commands.

In various embodiments, a system for monitoring a health status of a servo valve includes a brake control unit; a non-transitory memory configured to store instructions; and a controller in electronic communication with the memory, the controller configured to control the brake control unit by: receiving a first hydraulic pressure signal from a first pressure sensor in communication with a brake actuator; receiving a second hydraulic pressure signal from a second pressure sensor in a non-primary braking system in communication with the brake actuator; comparing the first hydraulic pressure signal and second hydraulic pressure signal according to predetermined criteria; validating the first pressure sensor based on the comparison; and in response to the first pressure sensor being validated, monitoring the health status of the servo valve in communication with the brake actuator based on predetermined criteria.

In various embodiments: the first hydraulic pressure signal is independent of the second hydraulic pressure signal and the first pressure sensor is independent of the second pressure sensor; and/or the controller is configured to validate the first pressure sensor by comparing the first hydraulic pressure signal and the second hydraulic pressure signal over multiple readings thereof over time; and/or the controller is configured to signal an alert in response to differences between the first hydraulic pressure signal and the second hydraulic pressure signal; and/or the controller is configured to signal an alert in response to the health status of the servo valve; and/or monitoring the health status of the servo valve in communication with the brake actuator based on predetermined criteria includes comparing an electric current signal input into the servo valve as converted into a hydraulic pressure signal and the first hydraulic pressure signal; and/or the brake actuator is configured to actuate a braking force on a wheel of an aircraft in response to one or more system inputs representing one or more brake commands.

In various embodiments, a method for monitoring a servo valve includes receiving a first hydraulic pressure signal from a first pressure sensor in communication with a brake actuator; receiving a second hydraulic pressure signal from a second pressure sensor in a non-primary braking system in communication with the brake actuator; comparing the first hydraulic pressure signal and second hydraulic pressure signal according to predetermined criteria; validating the first pressure sensor based on the comparison; and in response to the first pressure sensor being validated, monitoring the health status of the servo valve in communication with the brake actuator based on predetermined criteria.

In various embodiments: the first hydraulic pressure signal is independent of the second hydraulic pressure signal and the first pressure sensor is independent of the second pressure sensor; and/or the method validates the first pressure sensor by comparing the first hydraulic pressure signal and the second hydraulic pressure signal over multiple readings thereof over time; and/or the methods signals an alert in response to differences between the first hydraulic pressure signal and the second hydraulic pressure signal; and/or the method signals an alert in response to the health status of the servo valve; and/or monitoring the health status of the servo valve in communication with the brake actuator based on predetermined criteria compares an electric current signal input into the servo valve as converted into a hydraulic pressure signal and the first hydraulic pressure signal.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

In various embodiments, FIG. 1-A illustrates an aircraft having multiple landing gear and brakes;

In various embodiments, FIG. 1-B is a block diagram of a brake control unit of the aircraft of FIG. 1-A;

In various embodiments, FIG. 1-C is a functional diagram of a braking system of the aircraft of FIG. 1-A, having a primary braking system and a non-primary braking system;

In various embodiments, FIG. 2-A is a flowchart of a method of validating a first pressure sensor; and In various embodiments, FIG. 2-B is a flowchart of a method of monitoring a health status of a servo valve.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, are systems and methods for monitoring a health status of a servo valve, such as within a braking system of an aircraft. While numerous details are included herein pertaining to aircraft components, such as brake components, the systems and methods disclosed herein can be applied to other systems with other servo valves and the like.

Referring now to FIG. 1-A, an aircraft 100 includes multiple landing gear systems, including a first landing gear 110, second landing gear 120, and third landing gear 130. The first landing gear 110, second landing gear 120, and third landing gear 130 each include one or more wheel assemblies. For example, the third landing gear 130 includes an inner wheel assembly 132 and an outer wheel assembly 134. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and oftentimes, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a brake control unit (BCU) 150. With brief reference now to FIG. 1-B, the BCU 150 includes one or more controllers 154 (e.g., processors) and one or more tangible, non-transitory memories 156 capable of implementing digital or programmatic logic. In various embodiments, for example, the one or more controllers 154 are one or more of a general purpose processor, DSP, ASIC, FPGA, or other programmable logic device, discrete gate, transistor logic, or discrete hardware components, or any various combinations thereof or the like, and the one or more memories 156 store instructions that are implemented by the one or more controllers 154 for performing various functions, such as monitoring a health status of a servo valve, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like.

Referring again more particularly to FIG. 1-A, the aircraft 100 further includes one or more brakes coupled to each wheel assembly. For example, a brake 160 is coupled to the outer wheel assembly 134 of the third landing gear 130 of the aircraft 100. In operation, the brake 160 applies a braking force to the outer wheel assembly 134 upon receiving a brake command, such as from the BCU 150. In various embodiments, the outer wheel assembly 134 of the third landing gear 130 of the aircraft 100 comprises any number of wheels.

Referring now also to FIG. 1-C, including with continued reference to FIGS. 1-A and 1-B as well, a closed-loop braking system 10 is shown in accordance with an embodiment of the inventive arrangements. The braking system 10 includes the brake control unit (BCU) 150 of FIGS. 1-A and 1-B, which is programmed to control some of the various braking functions described herein. In various embodiments, the braking system 10 enables braking the aircraft 100. However, it will be appreciated that the braking system 100 may also be used in connection with other types of vehicles and other without departing from the scope of the inventive arrangements.

As will be elaborated upon, the braking system 10 generally includes a primary braking system and a non-primary braking system 80. Generally speaking, the primary braking system includes all the components of the braking system 10 that are not part of the non-primary braking system 80.

As described herein, the primary braking system generally includes, inter alia, a primary power source 30 acting through i) a left wheel servo valve 42*l* to apply hydraulic pressure through a left hydraulic line 44*l* and shuttle valve 70 to apply a braking force to actuators 28 of a left wheel/brake assembly 22*l*; and ii) a right wheel servo valve 42*r* to apply hydraulic pressure through a right hydraulic line 44*r* and shuttle valve 70 to apply a braking force to actuators 28 of a right wheel/brake assembly 22*r*. Within the primary braking system, first pressure sensors 48 are intermediate, and in fluid communication with, the actuators 28 and shuttle valves 70 of the left wheel/brake assembly 22*l* and right wheel/brake assembly 22*r*.

As described herein, the non-primary braking system 80 generally includes, inter alia, a non-primary power source 82 acting to apply hydraulic pressure through a non-primary hydraulic line 86 and the shuttle valves 70 to apply a braking force to the actuators 28 of the left wheel/brake assembly 22*l* and right wheel/brake assembly 22*r*. Within the non-primary braking system 80, a second pressure sensor 49 is intermediate, and in fluid communication with, a non-primary brake valve 75 and the shuttle valves 70 of the left wheel/brake assembly 22*l* and right wheel/brake assembly 22*r*. In various embodiments, the non-primary braking system 80 generally comprises an emergency brake for the aircraft 100, a parking brake for the aircraft 100, and/or other.

In various embodiments, the shuttle valves 70, first pressure sensors 48, and actuators 28 are common to both the primary braking system and the non-primary braking system 80 of the braking system 10 of the aircraft 100.

In various embodiments of the primary braking system, the BCU 150 receives brake command signals from a left pilot brake pedal 14*l* and a right pilot brake pedal 14*r* and/or a left co-pilot brake pedal 16*l* and a right co-pilot brake pedal 16*r*. The brake command signals from the left pilot brake pedal 14*l* and the right pilot brake pedal 14*r* and/or the left co-pilot brake pedal 16*l* and the right co-pilot brake pedal 16*r* are indicative of a desired amount of braking. In addition, the BCU 150 receives control signals from an auto-brake interface 18 for performing conventional auto-brake and rejected take-off (RTO) braking functions. The BCU 150 also receives a series of discrete control signals associated with the aircraft 100, generally represented as 20, for providing braking control thereof.

In various embodiments, the BCU 150 controls braking of a left wheel/brake assembly 22*l* and a right wheel/brake assembly 22*r*, as noted above. The left wheel/brake assembly 22*l* includes one or more wheels 24 and brake stacks 26. A plurality of actuators 28 are provided for exerting braking forces on the brake stacks 26 in order to brake the wheels 24. The right wheel/brake assembly 22*r* has a similar, mirrored configuration. Both the left wheel/brake assembly 22*l* and the right wheel/brake assembly 22*r* also include, in various embodiments, wheel speed sensors 27 that provide wheel speed information to the BCU 150 for carrying out brake control operations.

In various embodiments of the primary braking system, a primary power source 30 serves as a primary brake power supply within the braking system 10. In various embodiments, a primary hydraulic line 32 from the primary power source 30 includes a check valve 34 and an accumulator 36. In various embodiments, the primary hydraulic line 32 is input into a dual valve assembly 38 included within the braking system 10. The dual valve assembly 38 includes a shutoff valve 40 through which the primary hydraulic line 32 supplies hydraulic fluid to the left wheel servo valve 42*l* and the right wheel servo valve 42*r*. In various embodiments, hydraulic fluid from the left wheel servo valve 42*l* and the right wheel servo valve 42*r* is respectively provided through a left hydraulic line 44*l* and a right hydraulic line 44*r* to apply the braking force to the wheels 24 during a primary braking operation. In various embodiments, a return line 47 is provided from the left wheel servo valve 42*l* and the right wheel servo valve 42*r* back to the primary power source 30.

During primary braking operations, hydraulic fluid pressure through the left hydraulic line 44*l* and the right hydraulic line 44*r* respectively passes to the corresponding actuators 28 via one or more of the corresponding shuttle valves 70. Thus, if the braking system 10 is functioning in the primary braking mode, the shutoff valve 40 is open to the left hydraulic line 44*l* and the right hydraulic line 44*r*, and the BCU 150 controls the amount of hydraulic pressure that is delivered to the wheels 24 respectively via the left wheel servo valve 42*l* and the right wheel servo valve 42*r* acting through the corresponding left hydraulic line 44*l* and right hydraulic line 44*r*.

During non-primary braking operations, hydraulic fluid pressure through the non-primary hydraulic line 86 passes to the corresponding actuators 28 via the shuttle valves 70. Thus, if the braking system 10 is functioning in the non-primary braking mode, the shutoff valve 40 is open to the non-primary hydraulic line 86, and the non-primary brake valve 75 controls the amount of hydraulic pressure that is delivered to the wheels 24 through the non-primary hydraulic line 86.

In various embodiments, the shuttle valves 70 determine whether the braking system 10 is operating in its primary braking mode or its non-primary braking mode.

In various embodiments, the shutoff valve 40, the left wheel servo valve 42*l*, and the right wheel servo valve 42*r* are dual control coil valves, and the BCU 150 utilizes a primary control channel and a secondary control channel for each. In various embodiments, the shutoff valve 40 receives a shutoff valve control signal on a dedicated line 50*p* from the primary channel and a shutoff valve control signal on a dedicated line 50*s* from the secondary channel. Similarly, the left wheel servo valve 42*l* receives a primary servo valve control signal on a dedicated line 52*p* from the primary channel and a secondary servo valve control signal on a dedicated line 52*s* from the secondary channel. Likewise, the right wheel servo valve 42*r* receives a primary servo valve control signal on a dedicated line 54*p* from the primary channel and a secondary servo valve control signal on a dedicated line 54*s* from the secondary channel. Because the left wheel servo valve 42*l* and the right wheel servo valve 42*r* are dual control coil valves, each valve can be controlled by both the primary and secondary channels of the BCU 150. Such redundancy allows full brake operation to continue even if one of the channels should fail.

In various embodiments, further redundancy is provided in the form of multiple transducers for providing the brake command signals from the left pilot brake pedal 14*l*, the right pilot brake pedal 14*r*, the left co-pilot brake pedal 16*l*, and the right co-pilot brake pedal 16*r* to the BCU 150. More particularly, the left pilot brake pedal 14*l* has a primary channel transducer 60*p* and a secondary channel transducer 60*s* associated therewith. Each of the primary channel transducer 60*p* and secondary channel transducer 60*s* provides a brake command signal to the BCU 150 that is indicative of a degree of travel of the left pilot brake pedal 14*l*, and thus the amount of desired braking by the left wheel/brake assembly 22*l*.

Similarly, the remaining right pilot brake pedal 14r, the left co-pilot brake pedal 16l, and the right co-pilot brake pedal 16r each have corresponding pairs of transducers respectively serving the primary and secondary channels in the BCU 150, including as follows: the right pilot brake pedal 14r includes transducers 62p and 62s serving the primary and secondary channels, respectively; the left co-pilot brake pedal 16l includes transducers 64p and 64s serving the primary and secondary channels, respectively; and the right co-pilot brake pedal 16r includes transducers 66p and 66s serving the primary and secondary channels, respectively. Collectively, the primary channel transducers are 60p, 62p, 64p, and 66p, and the secondary channel transducers are 60s, 62s, 64s, and 66s, and they may be collectively referred to herein as the transducers 60p, 60s, 62p, 62s, 64p, 64s, 66p, and 66s. In various embodiments, the transducers 60p, 60s, 62p, 62s, 64p, 64s, 66p, 66s for respectively detecting the degree of movement of the left pilot brake pedal 14l and the right pilot brake pedal 14r and/or the the left co-pilot brake pedal 16l and the right co-pilot brake pedal 16r are each linear variable differential transformers (LVDTs). In various embodiments, it will be appreciated that other transducers are used without departing from the scope of the inventive arrangements.

In various embodiments, the braking system 10 includes first pressure sensors 48 for monitoring the hydraulic pressure in the left hydraulic line 44l and the right hydraulic line 44r and providing such information back to the BCU 150. In addition, power to the BCU 150 is provided from an aircraft power source 72, such as a DC power source within the aircraft 100. In various embodiments, power is transmitted from the aircraft power source 72 to the BCU 150 via two separate and independent power buses—that is, power to the primary channel and secondary channel is provided to the BCU 150 via respective power buses 28 VDC #1 and 28 VDC #2 in communication with the aircraft power source 72. Thus, a loss of power in relation to one channel does not disable the other channel, for example.

In various embodiments, the braking system 10 further includes an output device and/or output display 74 coupled to the BCU 150. The output device and/or output display 74 is configured to communicate information to the pilot, co-pilot, and/or maintenance crew relating to the braking operations. For example, in various embodiments, the output device and/or output display 74 includes a display, a speaker, a network access device, and/or the like that sends a message to a remote terminal, or the like. In various embodiments, the BCU 150 controls the output device and/or display 74 to output the health status of the braking system 10, including the various components thereof.

In various embodiments, the braking system 10 also includes a non-primary braking system 80 as an additional level of redundancy, as previously described. The non-primary braking system 80 can be used in the event of a failure within the primary braking system. In various embodiments, the non-primary braking system 80 includes a separate power source, such as a non-primary power source 82, that provides power to the actuators 28 via the non-primary hydraulic line 86 in communication with a non-primary brake valve 75 activated by a non-primary brake handle 83 that is separate from the left pilot brake pedal 14l, the right pilot brake pedal 14r, the left co-pilot brake pedal 16l, and the right co-pilot brake pedal 16r. The non-primary braking system 80 also includes an independent pressure sensor 49 for monitoring the hydraulic pressure in the non-primary hydraulic line 86 and providing such information back to the BCU 150. In various embodiments, the first pressure sensors 48 for monitoring the hydraulic pressure in the left hydraulic line 44l and the right hydraulic line 44r are independent of the pressure sensor 49 for monitoring the hydraulic pressure in the non-primary hydraulic line 86 of the non-primary braking system 80.

In various embodiments, the braking system 10 provides a high level of reliability and availability. This is achieved through, inter alia, the use of redundant components throughout numerous parts of the braking system 10. As noted above, a central component of the braking system is the BCU 150, which contains two redundant brake control channels identified as primary and secondary. Each of these channels is capable of performing full brake control independently of the other, and they are preferably physically and electrically and hydraulically isolated from each other within the braking system 10. Likewise, the primary braking system is also physically and electrically and hydraulically isolated from the non-primary braking system 80. For example, the primary braking system is activated by the left pilot brake pedal 14l, the right pilot brake pedal 14r, the left co-pilot brake pedal 16l, and the right co-pilot brake pedal 16r respectively acting through the left wheel servo valve 42r, the right wheel servo valve 42r, the left hydraulic line 44l, and the right hydraulic line 44r. The non-primary braking system 80, on the other hand, is activated by the non-primary brake handle 83 and the non-primary brake valve 75 acting through the non-primary hydraulic line 86, in various embodiments.

The primary braking system 10 utilizes the shutoff valve 40 in-line with the left wheel servo valve 42l and the right wheel servo valve 42r to provide a level of redundancy that ensures a single valve failure cannot cause inadvertent braking. In order for the braking force to be applied by the braking system 10 to the left wheel/brake assembly 22l and the right wheel/brake assembly 22r, the shutoff valve 40 must be open along with at least one of the left servo valve 42l and the right servo valve 42r. To provide a redundancy so that the brakes can be operated when commanded, each of the valves (shutoff and servo) contain dual control coils with one coil for each channel in the BCU 150, as described above.

The BCU 150 utilizes outputs from the transducers 60p, 60s, 62p, 62s, 64p, 64s, 66p and 66s to measure the degree to which each respective left pilot brake pedal 14l, right pilot brake pedal 14r, left co-pilot brake pedal 16l, and right co-pilot brake pedal 16r is depressed. As noted above, to ensure the integrity of the braking commands from the left pilot brake pedal 14l, the right pilot brake pedal 14r, the left co-pilot brake pedal 16l, and the right co-pilot brake pedal 16r, the braking system 10 utilizes, in various embodiments, multiple transducers 60p, 60s, 62p, 62s, 64p, 64s, 66p and 66s under each of the left pilot brake pedal 14l, the right pilot brake pedal 14r, the left co-pilot brake pedal 16l, and the right co-pilot brake pedal 16r. And although two transducers are shown for each of the left pilot brake pedal 14l, the right pilot brake pedal 14r, the left co-pilot brake pedal 16l, and the right co-pilot brake pedal 16r, any number of transducers may be used for additional redundancy, in various embodiments. In various embodiments, one transducer for each of the left pilot brake pedal 14l, the right pilot brake pedal 14r, the left co-pilot brake pedal 16l, and the right co-pilot brake pedal 16r is monitored by the primary channel of the BCU 150, and the other transducer for the left pilot brake pedal 14l, the right pilot brake pedal 14r, the left co-pilot brake pedal 16l, and the right co-pilot brake pedal 16r is monitored by the secondary channel of the BCU 150.

In various embodiments, the transducers 60p, 60s, 62p, 62s, 64p, 64s, 66p and 66s provide inputs to the BCU 150. For example, the primary and secondary channels within the BCU 150 utilize internal discrete signals to communicate the status of their respective transducers to the other channel. Under primary braking conditions, both transducers within the dual transducers for a given brake pedal must be active in order for the BCU 150 to command braking based on pedal inputs.

As will elaborated upon, the BCU 150 is configured to monitor a health status of a servo value, such as the left wheel servo valve 42l and the right wheel servo valve 42r of FIG. 1-C. To do so, the left wheel servo valve 42l and the right wheel servo valve 42r are first validated, in various embodiments. To validate the left wheel servo valve 42l and the right wheel servo valve 42r, the first pressure sensors 48 in the primary braking system and the second pressure sensor 49 in the non-primary braking system 80 are used, in various embodiments.

More specifically, the braking system 10 operates in the non-primary braking mode whenever the non-primary brake handle 83 and non-primary brake valve 75 are activated. This activates hydraulic pressure in the non-primary hydraulic line 86 that passes through the shuttle valves 70 to actuate the actuators 28 to apply the braking force to the wheels 24 of the aircraft 100. This hydraulic pressure in the non-primary hydraulic line 86 is read by the second pressure sensor 49, which is intermediate, and in fluid communication with, the non-primary brake valve 75 and the shuttle valves 70.

In various embodiments, the second pressure sensor 49 in the non-primary braking system 80 is used to validate the first pressure sensors 48. In other words, the first pressure sensors 48 are validated by the second pressure sensor 49, and this occurs, in various embodiments, anytime the non-primary braking system 80 is activated.

In order to validate the first pressure sensors 48, the first hydraulic pressure read by the BCU 150 at the first pressure sensors 48 must match the second hydraulic pressure read by the BCU 150 at the second pressure sensor 49. More specifically, the first hydraulic pressure read by the BCU 150 at the first pressure sensors 48 and the second hydraulic pressure read by the BCU 150 at the second pressure sensor 49 must match according to predetermined criteria, such as predetermined thresholds, maintained by the BCU 150 for how close the first hydraulic pressure and second hydraulic pressure must be.

In various embodiments, if the first hydraulic pressure read by the BCU 150 at the first pressure sensors 48 and the second hydraulic pressure read by the BCU 150 at the second pressure sensor 49 do match according to predetermined criteria maintained by the BCU 150, then the BCU 150 validates the first pressure sensor 48. In various embodiments, the first pressure sensors 48 are validated in this fashion every time, or substantially every time, that the non-primary braking system 80 is used. In various embodiments, the BCU 150 maintains logs or records of validating the first pressure sensors 48, including over multiple readings thereof over predetermined periods of time, including against the second pressure sensor 49.

If the first hydraulic pressure read by the BCU 150 at the first pressure sensors 48 and the second hydraulic pressure read by the BCU 150 at the second pressure sensor 49 do not match according to predetermined criteria maintained by the BCU 150, then the first pressure sensors 48 is not validated, and the BCU can signal an alert via the output device and/or output display 74 coupled to the BCU 150, in various embodiments.

Once the first pressure sensors 48 are validated, the BCU 150 can then monitor the health status of the left wheel servo valve 42l and the right wheel servo valve 42r. More specifically, once the BCU 150 validates the first pressure sensors 48, the BCU 150 can monitor the relationship between command current and hydraulic pressure at the left wheel servo valve 42l and the right wheel servo valve 42r, including over multiple readings thereof over time. In various embodiments, the BCU 150 monitors the health status of the left wheel servo valve 42l and the right wheel servo valve 42r in communication with the brake actuators 28 by comparing an electric current signal input into the left wheel servo valve 42l and the right wheel servo valve 42r as converted into hydraulic pressure signals and the first hydraulic pressure read by the BCU 150 at the first pressure sensors 48.

More specifically, since relationships between command current and hydraulic pressure at the left wheel servo valve 42l and the right wheel servo valve 42r are known, deviations therefrom, including over multiple readings over time, are used to monitor the health status of the left wheel servo valve 42l and the right wheel servo valve 42r. As a result, the BCU 150 determines, in various embodiments, whether either or both the left wheel servo valve 42l and the right wheel servo valve 42r are working in degraded fashions. In various embodiments, the BCU 150 does so by validating the first pressure sensors 48 and then comparing electrical current values as input into the left wheel servo valve 42l and the right wheel servo valve 42r, as converted into hydraulic pressure signals, against the first hydraulic pressure read by the BCU 150 at the first pressure sensors 48.

In various embodiments, the BCU 150 can make these determinations every time, for example, that the aircraft 100 is placed in a non-transient parked state at an airport hangar, garage, gate, or the like by comparing the first hydraulic pressure at the actuators 28 from the first pressure sensors 48 in the primary braking path along the left hydraulic line 44l and right hydraulic line 44r against the second hydraulic pressure at the actuators 28 from the second pressure sensor 49 in the non-primary braking path along the non-primary hydraulic line 86.

In response to the BCU 150 determining, in various embodiments, whether the left wheel servo valve 42l and the right wheel servo valve 42r are working in degraded fashions, the braking system 10, in various embodiments, still performs as intended, but the BCU 150 can monitor a possibly developing issue with the left wheel servo valve 42l and/or the right wheel servo valve 42r before an actual failure of the left wheel servo valve 42l and/or the right wheel servo valve 42r occurs. For example, the BCU 150 can store the control current values over time in its memories 156 and monitor variations in the output hydraulic pressures from the first pressure sensors 48 once the left wheel servo valve 42l and the right wheel servo valve 42r have been validated. In various embodiments, after the BCU 150 has determined the current value has been, for example, above or below a certain threshold for a predetermined number of cycles, the BCU 150 indicates (e.g., via the output device and/or output display 74) that the left wheel servo valve 42l and/or the right wheel servo valve 42r may or will need to be replaced in so many flight cycles or power-up cycles. In various embodiments, the BCU 150 also uses multiple thresholds to monitor a degree of degradation over time of the left wheel servo valve 42l and/or right wheel servo valve

42*r*. In various embodiments, it can also calculate a rate of change of the electrical current versus hydraulic pressure and monitor variations of this rate over time. When the rate of change becomes higher than a certain threshold, for example, the BCU 150 determines and reports, in various embodiments, that the left wheel servo valve 42*l* and the right wheel servo valve 42*r* may or will benefit from being repaired or replaced in a predetermined number of power cycles or flight cycles, even if no faults have yet been detected. This enables a pilot, co-pilot, maintenance crew, and/or other to schedule the aircraft 100 for a convenient replacement time of the left wheel servo valve 42*l* and/or right wheel servo valve 42*r* and avoid unexpected flight interruptions for the aircraft 100.

Referring now to FIG. 2-A, a method of validating the first pressure sensors 48 is provided. More specifically, the method begins in a step 200, after which it is determined if a braking system is operating in a non-primary braking mode at a step 202. If the braking system is not operating in a non-primary braking mode at step 202, then the method ends at a step 216. In various embodiments, if the braking system is operating in a non-primary braking mode at step 202, then the method receives a first hydraulic pressure signal from a first pressure sensor at a step 204, after which the method receives a second hydraulic pressure signal from a second pressure sensor at a step 206. Thereafter, the method compares the first hydraulic pressure signal from the first pressure sensor and the second hydraulic pressure signal from the second pressure sensor at a step 208. Thereafter, it is determined if the first hydraulic pressure signal from the first pressure sensor and the second hydraulic pressure signal from the second pressure sensor match according to predetermined criteria at a step 210. If the first hydraulic pressure signal from the first pressure sensor and the second hydraulic pressure signal from the second pressure sensor do not match according to predetermined criteria in step 210, then the method, in various embodiments, signals an alert at a step 214, after which the method ends at step 216. In various embodiments, if the first hydraulic pressure signal from the first pressure sensor and the second hydraulic pressure signal from the second pressure sensor do match according to predetermined criteria in step 210, then the first pressure sensor is validated at step 212, after which the method of FIG. 2-A ends at step 216.

Referring now to FIG. 2-B, a method of monitoring a health status of a servo valve is provided. More specifically, the method begins in a step 220, after which it is determined if a braking system is operating in a primary braking mode at a step 222. If the braking system is not operating in the primary braking mode at step 222, then the method ends at a step 228. In various embodiments, if the braking system is operating in the primary braking mode at step 222, then the method determines if a pressure sensor has been validated at a step 224—such as by the method of FIG. 2-A. If the pressure sensor has not been validated at step 224, then the method ends at step 228. In various embodiments, if the pressure sensor has been validated at step 224, then the method monitors a health status of a servo valve based on predetermined criteria about the servo valve at a step 226, such as by comparing control current at the servo valve, as converted into hydraulic pressure signals, with the first hydraulic pressure signal from a first pressure sensor at step 204 in FIG. 2-A, after which the method of FIG. 2-B ends at step 228.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A brake control system for monitoring a health status of a servo valve, comprising:
    a non-transitory memory configured to store instructions; and
    a controller in electronic communication with the memory, the controller configured to:
        receive a first hydraulic pressure signal from a first pressure sensor in communication with a brake actuator;
        receive a second hydraulic pressure signal from a second pressure sensor in a non-primary braking system in communication with the brake actuator;
        compare the first hydraulic pressure signal and second hydraulic pressure signal according to predetermined criteria;
        validate the first pressure sensor based on the comparison; and
        in response to the first pressure sensor being validated, monitor the health status of the servo valve in communication with the brake actuator based on predetermined criteria.

2. The system of claim 1, wherein the first hydraulic pressure signal is independent of the second hydraulic pressure signal and the first pressure sensor is independent of the second pressure sensor.

3. The system of claim 1, wherein the controller is configured to validate the first pressure sensor by comparing the first hydraulic pressure signal and the second hydraulic pressure signal over multiple readings thereof over time.

4. The system of claim 1, wherein the controller is configured to signal an alert in response to differences between the first hydraulic pressure signal and the second hydraulic pressure signal.

5. The system of claim 1, wherein the controller is configured to signal an alert in response to the health status of the servo valve.

6. The system of claim 1, wherein monitoring the health status of the servo valve in communication with the brake actuator based on predetermined criteria comprises comparing an electric current signal input into the servo valve as converted into a hydraulic pressure signal and the first hydraulic pressure signal.

7. The system of claim 1, wherein the brake actuator is configured to actuate a braking force on a wheel of an aircraft in response to one or more system inputs representing one or more brake commands.

8. A system for monitoring a health status of a servo valve, comprising
    a brake control unit;
    a non-transitory memory configured to store instructions; and
    a controller in electronic communication with the memory, the controller configured to control the brake control unit by:
        receiving a first hydraulic pressure signal from a first pressure sensor in communication with a brake actuator;
        receiving a second hydraulic pressure signal from a second pressure sensor in a non-primary braking system in communication with the brake actuator;
        comparing the first hydraulic pressure signal and second hydraulic pressure signal according to predetermined criteria;
        validating the first pressure sensor based on the comparison; and
        in response to the first pressure sensor being validated, monitoring the health status of the servo valve in communication with the brake actuator based on predetermined criteria.

9. The system of claim 8, wherein the first hydraulic pressure signal is independent of the second hydraulic pressure signal and the first pressure sensor is independent of the second pressure sensor.

10. The system of claim 8, wherein the controller is configured to validate the first pressure sensor by comparing the first hydraulic pressure signal and the second hydraulic pressure signal over multiple readings thereof over time.

11. The system of claim 8, wherein the controller is configured to signal an alert in response to differences between the first hydraulic pressure signal and the second hydraulic pressure signal.

12. The system of claim 8, wherein the controller is configured to signal an alert in response to the health status of the servo valve.

13. The system of claim 8, wherein monitoring the health status of the servo valve in communication with the brake actuator based on predetermined criteria comprises comparing an electric current signal input into the servo valve as converted into a hydraulic pressure signal and the first hydraulic pressure signal.

14. The system of claim 8, wherein the brake actuator is configured to actuate a braking force on a wheel of an aircraft in response to one or more system inputs representing one or more brake commands.

15. A method for monitoring a servo valve, comprising:
    receiving a first hydraulic pressure signal from a first pressure sensor in communication with a brake actuator;
    receiving a second hydraulic pressure signal from a second pressure sensor in a non-primary braking system in communication with the brake actuator;
    comparing the first hydraulic pressure signal and second hydraulic pressure signal according to predetermined criteria;
    validating the first pressure sensor based on the comparison; and
    in response to the first pressure sensor being validated, monitoring the health status of the servo valve in communication with the brake actuator based on predetermined criteria.

16. The method of claim 15, wherein the first hydraulic pressure signal is independent of the second hydraulic pressure signal and the first pressure sensor is independent of the second pressure sensor.

17. The method of claim 15, further comprising validating the first pressure sensor by comparing the first hydraulic pressure signal and the second hydraulic pressure signal over multiple readings thereof over time.

18. The method of claim 15, further comprising signaling an alert in response to differences between the first hydraulic pressure signal and the second hydraulic pressure signal.

19. The method of claim 15, further comprising signaling an alert in response to the health status of the servo valve.

20. The method of claim 15, wherein monitoring the health status of the servo valve in communication with the brake actuator based on predetermined criteria comprises comparing an electric current signal input into the servo valve as converted into a hydraulic pressure signal and the first hydraulic pressure signal.

\* \* \* \* \*